US010620999B2

(12) United States Patent
Devireddy (10) Patent No.: US 10,620,999 B2
(45) Date of Patent: Apr. 14, 2020

(54) TASK SCHEDULING THROUGH AN OPERATING SYSTEM AGNOSTIC SYSTEM ABSTRACTION LAYER FROM A TOP OF THE RACK SWITCH IN A HYPER CONVERGED INFRASTRUCTURE (71) Applicant: Western Digital Technologies, Inc., San Jose, CA (US)

(72) Inventor: Kishore Kumar Reddy Devireddy, San Jose, CA (US)

(73) Assignee: Western Digital Technologies, Inc, San Jose, CA (US)

( * ) Notice: Subject to any disclaimer, the term of this patent is extended or adjusted under 35 U.S.C. 154(b) by 0 days.

(21) Appl. No.: 15/807,568

(22) Filed: Nov. 8, 2017

(65) Prior Publication Data
US 2019/0138360 A1    May 9, 2019

(51) Int. Cl.
*G06F 9/50*    (2006.01)
*G06F 9/54*    (2006.01)
(52) U.S. Cl.
CPC ............ *G06F 9/5044* (2013.01); *G06F 9/541* (2013.01); *G06F 2209/503* (2013.01)
(58) Field of Classification Search
None
See application file for complete search history.

(56) References Cited

U.S. PATENT DOCUMENTS

| | | | | |
|---|---|---|---|---|
| 9,130,844 B1* | 9/2015 | Malik | ................. | H04L 67/1004 |
| 2004/0006614 A1* | 1/2004 | DiFalco | .............. | H04L 41/0893 |
| | | | | 709/223 |
| 2011/0055385 A1* | 3/2011 | Tung | ..................... | G06F 9/5072 |
| | | | | 709/224 |
| 2012/0278378 A1* | 11/2012 | Lehane | ............... | H04L 41/5054 |
| | | | | 709/201 |
| 2014/0011900 A1* | 1/2014 | Burns | ................... | C08F 210/02 |
| | | | | 521/142 |
| 2014/0373012 A1* | 12/2014 | Ylitalo | ................ | G06F 9/45558 |
| | | | | 718/1 |
| 2015/0370589 A1* | 12/2015 | Bidarkar | ............. | G06F 9/45558 |
| | | | | 718/1 |

(Continued)

OTHER PUBLICATIONS

Hewlett Packard, "Automated Deployment of Docker Hosts on Bare-metal Infrastructure," Nov. 2015 (16 pages).

(Continued)

*Primary Examiner* — Wynuel S Aquino
(74) *Attorney, Agent, or Firm* — Patent Law Works LLP (57) ABSTRACT An operating system agnostic task scheduler executes on a top of the rack device. The task scheduler receives from each of multiple nodes an operating system agnostic description of the node's computational resource capability and availability. The task scheduler uses the received information to maintain a resource accounting for each node. Requests to execute tasks are received by the task scheduler from external sources. The task scheduler matches specific tasks to specific nodes, based on the resource accounting. In response to matching a given task to a specific one of the nodes, the scheduler assigns the task to the node, and the task executes thereon. The task scheduler updates the maintained accounting based on computational resources allocated to the task by the node to which it was assigned.

20 Claims, 5 Drawing Sheets (56) References Cited

U.S. PATENT DOCUMENTS

2018/0027063 A1\* 1/2018 Nachimuthu ......... G06F 3/0613
 709/226
2019/0007369 A1\* 1/2019 Nirwal ................ H04L 61/2015

OTHER PUBLICATIONS

Hewlett Packard, "HPE OneView architectural advantages," Oct. 2016 (16 pages).
Lalli, "Automation of Support Pack for ProLiant in HPE OneView," Oct. 24, 2016 (7 pages).
Fidacaro, "HPE integrates DCIM for 'workload to watt' analysis and software-defined infrastructure," Jan. 4, 2017 (4 pages).

\* cited by examiner

TASK SCHEDULING THROUGH AN OPERATING SYSTEM AGNOSTIC SYSTEM ABSTRACTION LAYER FROM A TOP OF THE RACK SWITCH IN A HYPER CONVERGED INFRASTRUCTURE

TECHNICAL FIELD

The present disclosure pertains generally to scheduling computing tasks, and more specifically to task scheduling through an operating system agnostic system abstraction layer from a top of the rack switch in a hyper converged infrastructure.

BACKGROUND

The rise in electronic and digital device technology has rapidly changed the way society communicates, interacts, and consumes goods and services. Modern computing devices, allow organizations and users to have access to a variety of useful applications in many locations. Using such applications results in the generation of a large amount of data. Storing and retrieving the produced data is a significant challenge associated with providing useful applications and devices.

The data generated by online services and other applications can be stored at data storage facilities. As the amount of data grows, having a plurality of users sending and requesting data can result in complications that reduce efficiency and speed. Quick access time in storage systems is essential for good performance. In response, efficient scheduling of computing tasks in storage infrastructures can improve the overall functioning of a data storage system significantly.

A Hyper Converged Infrastructure ("HCI") is a rack based system with combination of compute, storage and networking components. Each rack in the HCI has one or (typically) more node(s), each of which typically includes compute, storage and networking capabilities. All nodes in a rack are connected to a Top of the Rack ("TOR") switch to access the external network. The number of nodes in the rack can vary based on the capacity requirements, which can change dynamically over time.

In conventional Hyper Converged Infrastructure systems, there is no standard abstraction of the hardware on the nodes at the operating system level. To the extent that some systems provide some level of abstraction at all, it is dependent on the specific type of operating system running on a given node. This negatively impacts scheduling tasks on multiple ones of the nodes on a rack. This is compounded further when different ones of the nodes run different operating systems.

SUMMARY

A Hyper Converged Infrastructure ("HCI") rack comprises at least a top of the rack ("TOR") device such as a TOR switch or fabric element, and multiple nodes. An operating system agnostic task scheduler executes on the TOR device, and a system abstraction layer ("SAL") runs on each one of the nodes. Different ones of the nodes run different operating systems, such as Windows, different distributions of Linux, etc. The SAL on each node has a frontend which exposes an Application Programming Interface ("API"), which the task scheduler utilizes to obtain operating system agnostic access to resources on the node. The SAL also has a backend which interacts with operating system and hardware level components on the node. The frontend is common for all operating systems, whereas the backend is operating system specific. In one embodiment, the frontend API is instantiated as a Representational state transfer ("RESTful") interface over Hyper Text Transfer Protocol Secure ("HTTPS") providing operating system agnostic output using JavaScript Object Notation ("JSON").

The task scheduler receives from each specific one of the nodes an operating system agnostic description the specific node's computational resource capability and availability. For example, the task scheduler can receive this operating system agnostic information in response to making requests to the SALs running on the nodes. The task scheduler uses the received information to maintain an accounting of computational resource capability and availability of each specific one of the nodes. Requests to execute tasks on the HCI rack are received by the task scheduler from external sources, such as requests to access given file system objects, or to perform specific computational operations on given input. The task scheduler matches specific tasks to specific nodes, based on the maintained accounting of computational resource capability and availability. In response to matching a given task to a specific one of the nodes, the scheduler assigns the task to the node, and the task executes thereon. The task scheduler updates the maintained accounting of computational resource capability and availability based on computational resources allocated to the task by the node to which it was assigned. For example, the task scheduler can receive an operating system agnostic quantification of the computational resources allocated to the assigned task, from the SAL running on the specific node to which the task was assigned. The task scheduler can then update the maintained resource accounting based on the received operating system agnostic quantification. The task scheduler can further receive updated operating system agnostic quantifications of the computational resources allocated to the assigned task, as the task runs and exits on the specific node. The task scheduler can further received updated operating system agnostic description information from one or more SALs running specific on specific ones of the nodes, and update the maintained accounting of computational resource capability accordingly. For example, such received updated operating system agnostic description information can indicate that specific nodes have been added to the rack or taken offline.

Other aspects include corresponding methods, systems, apparatus, and computer program products for these and other innovative aspects.

Note that the above list of features is not all-inclusive and many additional features and advantages are contemplated and fall within the scope of the present disclosure. Moreover, the language used in the present disclosure has been principally selected for readability and instructional purposes, and not to limit the scope of the subject matter disclosed herein.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The present disclosure describes technology, which may include methods, systems, apparatuses, computer program products, and other implementations, for task scheduling through an operating system agnostic system abstraction layer from a top of the rack switch in hyper converged infrastructure. In the following description, for purposes of explanation, numerous specific details are set forth to provide a thorough understanding of the various aspects of different example embodiments. Note that any particular example embodiment may in various cases be practiced without all of the specific details and/or with variations, permutations, and combinations of the various features and elements described herein.

An operating system agnostic system abstraction layer ("SAL") runs on each node in a hyper converged infrastructure ("HCI") rack, residing on top of the node's operating system ("OS") and hardware. The abstraction layer hides the implementation details of the hardware platform and the operating system from the upper layers of software. An operating system agnostic task scheduler runs on the top of the rack ("TOR") switch (or other TOR device), and obtains resource capabilities and availability details from each node by interfacing with the corresponding system abstraction layer. Tasks are scheduled and matched to specific nodes based on resources and availability. Because the system abstraction layers hide the operating system and hardware details of the various nodes, the task scheduler is agnostic to the varying low level configurations on different nodes. Because the task scheduler runs on the top of the rack switch, it is also independent of the number of nodes in the rack, and is not affected as nodes are taken off line, replaced or added.

Figure 1:
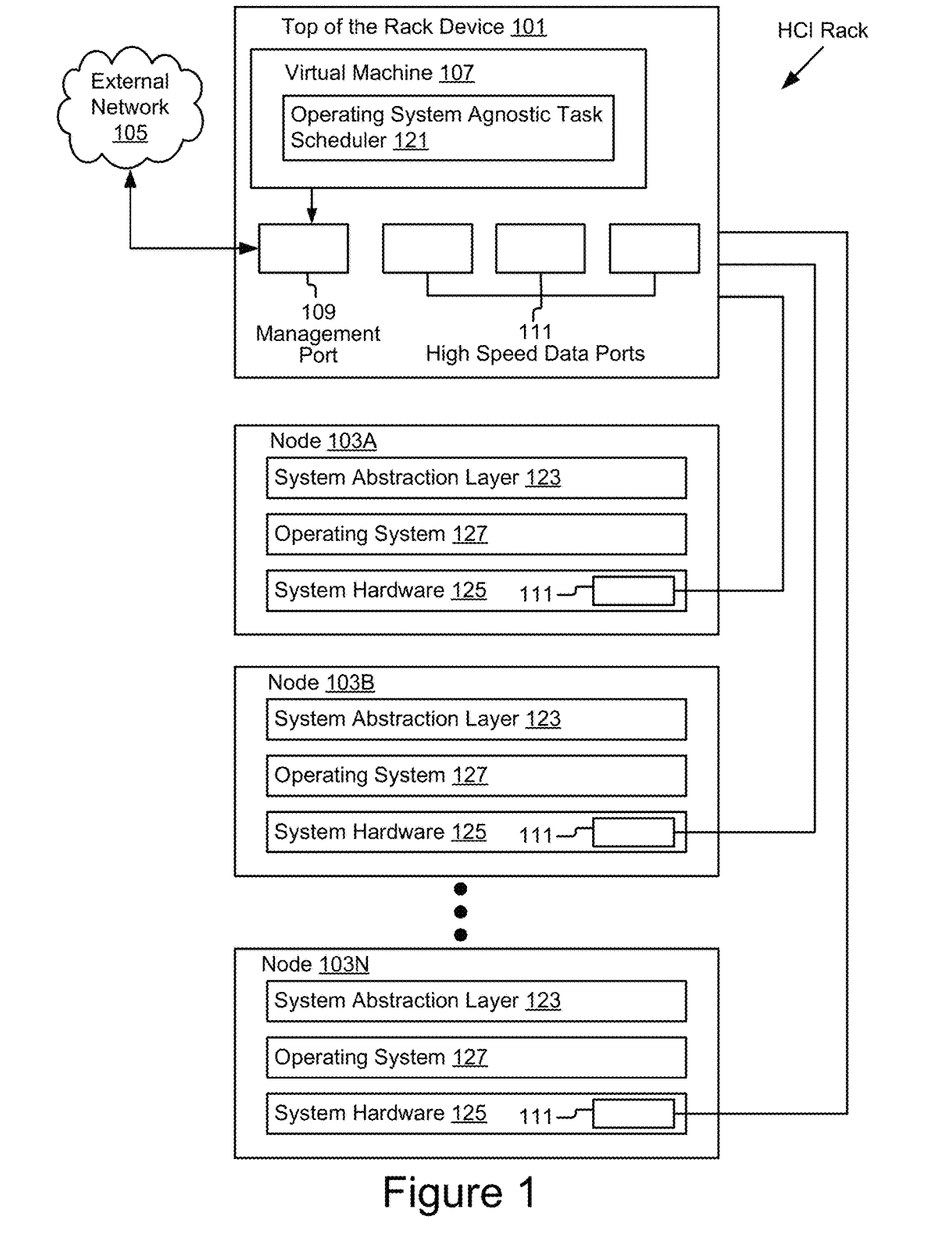
FIG. 1 is a diagram of a rack in a Hyper Converged Infrastructure ("HCI") in which an operating system agnostic task scheduler can operate, according to some embodiments.

Turning to FIG. 1, a Hyper Converged Infrastructure ("HCI") is a rack based system with a combination of compute, storage and networking components. FIG. 1 illustrates an example of a hyper-converged infrastructure rack 100 that includes a top of the rack device 101 and three nodes 103A, 103B and 103N. It is to be understood that this is only an example. HCI racks 100 may contain more or fewer nodes 103 in different configurations as desired. The number of nodes 103 in a rack 100 can vary based on the capacity requirements, which can change dynamically over time. Racks 100 can also include multiple top of the rack devices 101 (e.g., a primary and a backup for redundancy). Generally every rack 100 in the HCI contains at least one top of the rack device 101 (e.g., a switch/Fabric element) and at least one node element 103 (e.g., a bare metal system). As described in more detail below in conjunction with FIG. 3, each node element 103 typically has compute, storage and networking capabilities (e.g., directly coupled compute, network, and storage resources). For example, node elements 103 may have system hardware 127 such as one or more processors for executing instructions, storage media for non-volatile data storage (e.g., magnetic, flash, optical, etc.), RAM for volatile data storage, one or more network interface controller(s) for connectivity, etc. An operating system agnostic system abstraction layer 123 runs on each node 103. The configurations of nodes 103 and the operations of the operating system agnostic system abstraction layer 123 are described in detail below in conjunction with FIGS. 3 and 5.

As illustrated in FIG. 1, each node element 103 in the rack 100 is connected to the top of the rack (TOR) device 101, which is typically in the form of a TOR switch/fabric element which also has some processing capability. The top of the rack device 101 provides connectivity between different ones of the nodes 103 in the rack 100, as well as connectivity to an external network 105. In one embodiment, a top of the rack device 101 can be instantiated using an Open Network Install Environment ("ONIE") capable top of the rack switch (Fabric element), pre-installed with an operating system as firmware to run open network operating systems, such as Linux. The Linux operating system includes a Kernel-based Virtual Machine ("KVM") hypervisor, which can be used to run virtual machines 107 as a service on the respective top of the rack device 101. In other embodiments, different instantiations of TOR devices 101 are deployed as desired. A top of the rack device 101 can include multiple management network ports 109 (e.g., 1G ports) and high speed data network ports 111. An operating system of a virtual machine 107 running on the running on top of the rack device 101 can access the external network 105 by creating a bridge between a management port 109 and a virtual network interface. The external network 105 may be in the form of the Internet, a different public network, or a private (e.g., enterprise level) WAN, LAN or the like.

In general, TOR switching refers to a networking configuration in which computing devices in a rack 100 are communicatively coupled to an in-rack network switch, which provides connectivity to networking and computing components external to the rack 100. For example, on-board management ports 109 and/or Intelligent Platform Management ("IPMI") ports 109 of node elements 103 may be connected to management ports 109 of the top of the rack device 101, e.g., through another switch (not illustrated), or high speed data ports 111 of node elements 103 may be connected directly to high speed data ports 111 of the top of the rack device 101.

Despite its name, a TOR device can be placed anywhere in the rack. TOR devices 101 are frequently but not necessarily placed at or near the top of the rack to enable convenient access to the cabling infrastructure that connects in-rack switches to external networking components (e.g., aggregation switches).

Figure 2:
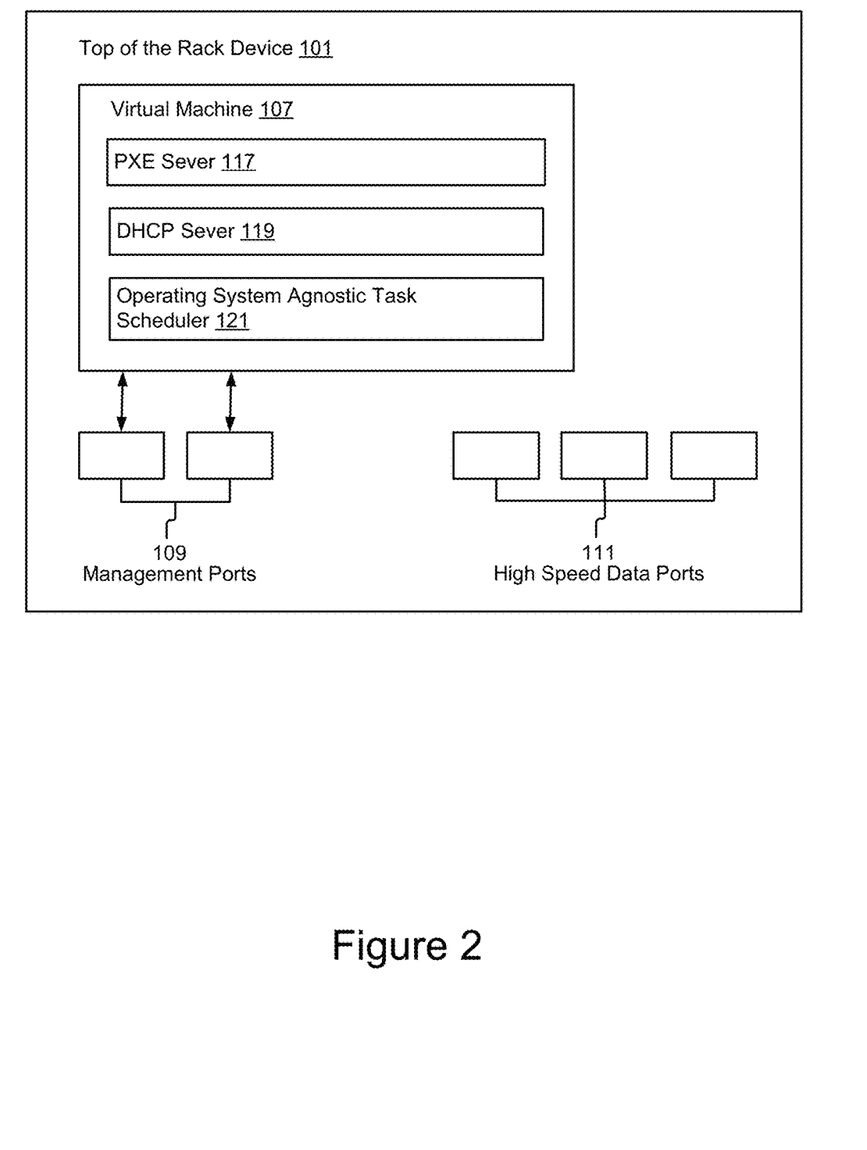
FIG. 2 is a diagram of a top of the rack ("TOR") switch of an HCI rack on which an operating system agnostic task scheduler can operate, according to some embodiments.

Turning now to FIG. 2, a top of the rack device 101 according to one embodiment is described in more detail. The top of the rack device 101 can provide a bootstrap mechanism for the node elements 103. More specifically, the top of the rack device 101 can run one or more virtual machines 107 for providing, for example, a Preboot eXecution Environment ("PXE") server 117 and a Dynamic Host Configuration Protocol ("DHCP") server 119 used to load operating systems and provide IP addresses to the node elements 103 respectively. The PXE server 117 may be populated with pre-built operating system images to be installed or booted on the node elements 103. The DHCP server 119 may be configured with an IP address range to be allocated to the node elements 103. New node elements 103 may be added to the rack 100 by connecting the network ports of the new node element 103 to the top of the rack device 101, and booting the new node element 103 in a network/PXE boot mode. The new node element obtains an IP address from the DHCP server 119 and boots an image downloaded from the PXE server 117.

A virtual machine 107 on the TOR device 101 can provide an operating system agnostic task scheduler 121 to schedule tasks 129 on the various node elements 103. In other embodiments, the operating system agnostic task scheduler 121 runs at a host level on the TOR device 101 (e.g., as an application running on the pre-installed TOR device operating system such as Linux). As described in greater detail below in conjunction with FIG. 4, the operating system agnostic task scheduler 121 may obtain node IP address details from the DHCP server 119, connect to each node's operating system agnostic system abstraction layer 123, and get the corresponding resource capability and availability details. As requests for executing tasks 129 are received, the operating system agnostic task scheduler 121 assigns each task 129 to a most suitable specific node 103, based on the resource capability and availability of the multiple nodes 103 on the rack 100. Note that this task scheduling continues even as specific nodes 103 are taken off line, and new nodes 103 are added. Even if all of the original nodes 101 in the rack 100 have been replaced, the operating system agnostic task scheduler 121 would continue operating without down time, because it is running on the top of the rack device 101.

Figure 3:
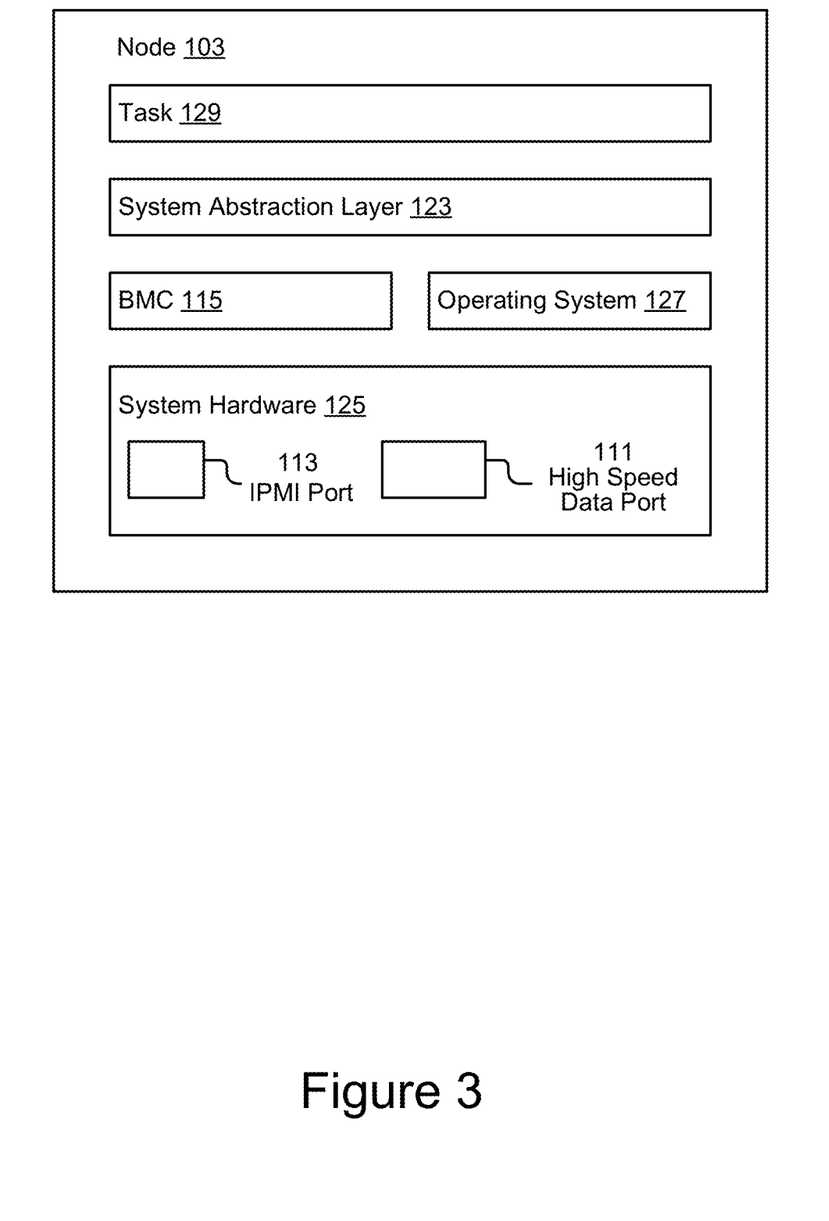
FIG. 3 is a diagram of a node element of an HCI rack on which an operating system agnostic task scheduler can operate, according to some embodiments.

Turning to FIG. 3, a node 103 is described in greater detail, according to one embodiment. Each node contains system hardware 125 and an operating system 127. It is to be understood that different nodes 103 can have different hardware configurations (e.g., different processors, storage media, network controllers, port configurations, memory configurations, etc.), and different operating systems 127 (e.g., various versions of Linux or other UNIX like systems, various versions of Windows, etc.). An IPMI port 113 on a node 103 can be used for communicating with a Board Management Controller ("BMC") 115 on the node 101. The BMC 115 can monitor the physical state of the node 103 and provide power management. On top of the system hardware 125, operating system 127 and BMC 115, an operating system SAL 123 runs on each node 103, and provides an interface between higher level applications (such as the task scheduler 121) and the underlying lower level resources of the node (e.g., the system hardware 125 and operating system 127). The operation of the SAL 123 is described in detail in conjunction with FIG. 5.

Figure 4:
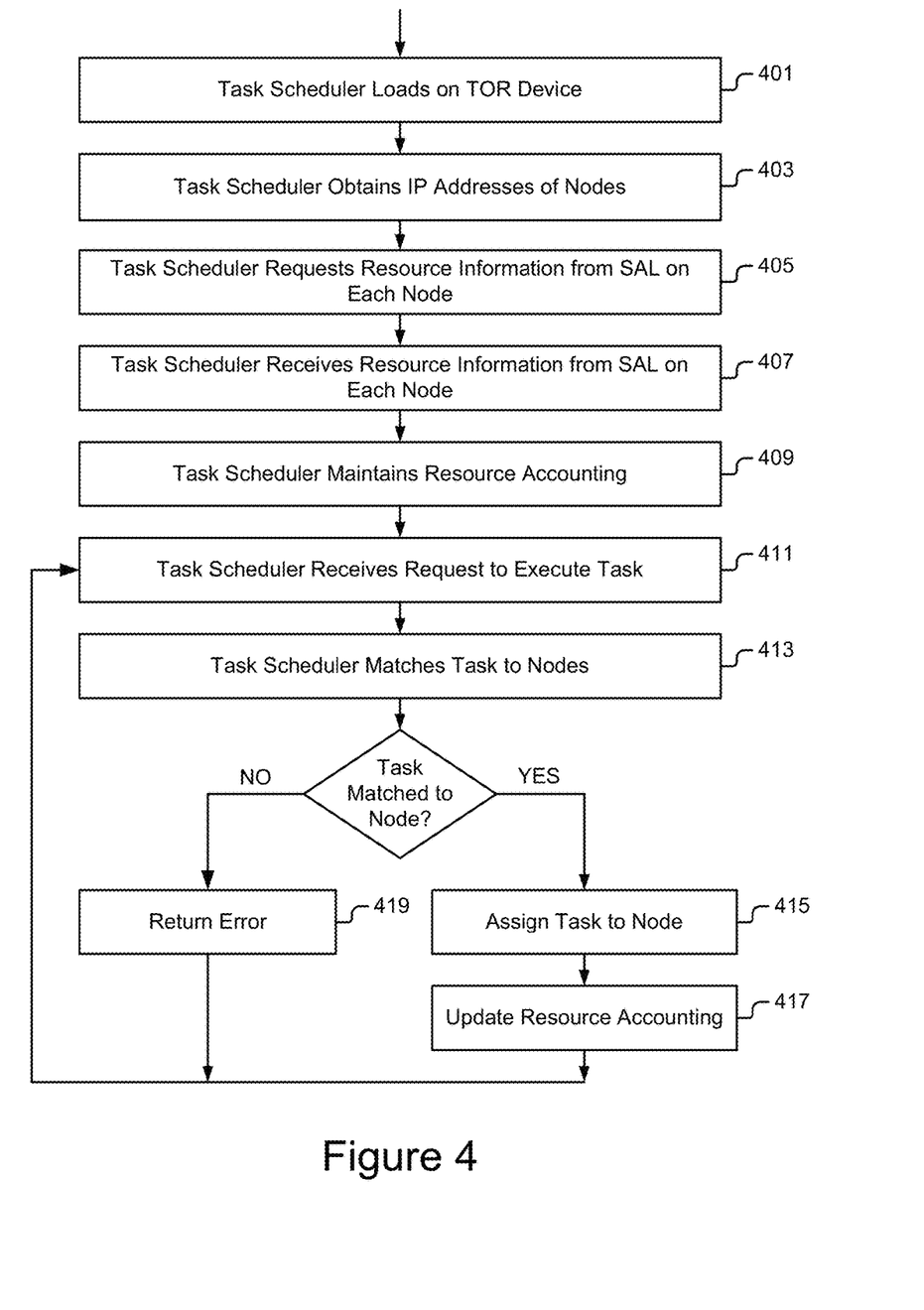
FIG. 4 is a flowchart showing the operation of an operating system agnostic task scheduler, according to some embodiments.

FIG. 4 illustrates steps executed by the operating system agnostic task scheduler 121, according to some embodiments. The operating system agnostic task scheduler 121 loads 401 on a TOR device 101 (for example, on a TOR switch/fabric element) of an HCI rack 100. For example, the operating system agnostic task scheduler 121 can be loaded as a process on a guest operating system (e.g., Linux) of a virtual machine 107 provided on the TOR device 101. The task scheduler 121 obtains 403 the IP address details for the multiple node elements 103 from the DHCP server 119. Using the corresponding IP addresses, the operating system agnostic task scheduler 121 requests 405 the computing resource capability and availability from the operating system agnostic SAL 123 on each node 103. As explained in greater detail below in conjunction with FIG. 5, the SAL 123 exposes an API which the task scheduler 121 calls to request a description of the computational resources on the corresponding node 103. The task scheduler 121 receives 407 from each SAL 123 a description of the corresponding node's computational resources and availability. This description is at a high enough level to hide the operating system level and hardware level details from the task scheduler 121. In other words, although different nodes 103 can run different operating systems 127 (e.g., Linux, BSD, Windows, etc.) and have different configurations of system hardware 125, these details are hidden from the operating system agnostic task scheduler 121 by the SALs 123, which as described in detail below provide a generalized, operating system agnostic description of the computing resources. Using this received information, the task scheduler 121 maintains 409 a current accounting of the per node 103 and total HCI rack 100 level computing resource capability and availability. It is to be understood that the task scheduler can request 405 and receive 407 updated resource information from the nodes 103 periodically, or receive such information from the nodes 103 automatically (e.g., when it changes at a node level). The task scheduler 121 can use the updated resource information to update 417 the tracked accounting of computational resource capability and availability.

The task scheduler 121 receives 411 requests from external sources (e.g., processes executing on computing devices outside of the rack 100 and/or HCI) to execute tasks 129 within the context of the HCI rack 100. It is to be understood that in different embodiments and under different circumstances, requests can be received to perform different types of tasks 129, such as requests to access (mount, open, read, write) given file system objects or other stored data, or perform specific computational operations on given input and the like. In response to receiving a request, the operating system agnostic task scheduler 121 matches 413 the task 129 to a specific node 103, based on the tracked resource capability and availability. Responsive to determining a best suitable match, the task scheduler 121 assigns the specific task 129 to the given node 103, on which the task 129 executes. The task scheduler 121 then updates 417 the corresponding maintained resource accounting. More specifically, the resource availability for the node 103 to which the task 129 has been assigned decreases due to the computational resources allocated to the assigned task 129. The SAL on that node 103 can provide a quantification of this change back to the task scheduler 121, which updates 417 its resource accounting accordingly. The SAL 123 can also provide status information to the task scheduler 121 as the task 129 runs and exits, which the task scheduler 121 can utilize to update 417 the tracked resource capability and availability. When the task scheduler 121 cannot schedule a given task 129, it can return 419 an error message to the requesting party, which can either resend the request (e.g., after a given amount of time), or execute an error protocol as desired. It is to be understood that computational resources can be described and tracked at any desired level of categorization and granularity (e.g., processing cycles, storage resources, network bandwidth, etc.).

Figure 5:
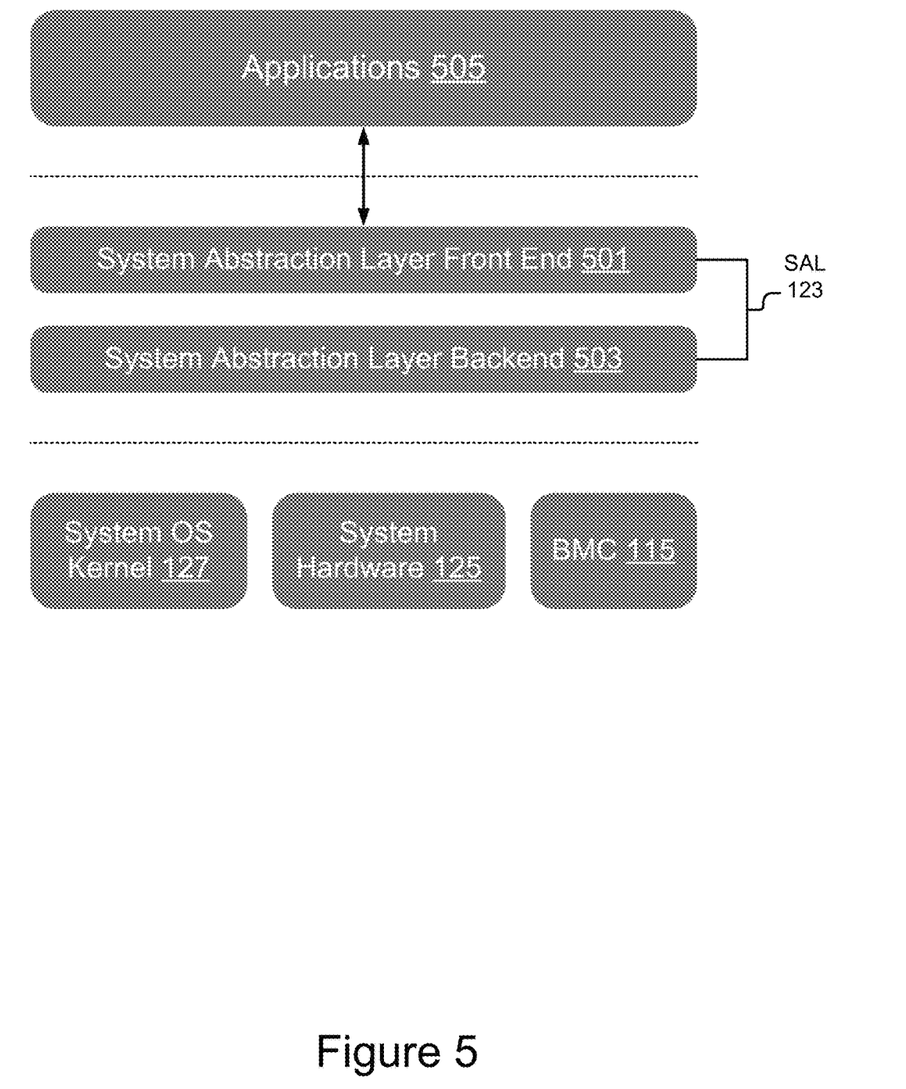
FIG. 5 is a diagram of an operating system agnostic system abstraction layer ("SAL"), according to some embodiments.

Turning now to FIG. 5, a System Abstraction Layer (SAL) 123 is described in greater detail. As noted above, each node 103 runs a SAL 123, which may be instantiated as a software layer which resides on top of the system hardware 125, operating system 127 and BMC 115. The SAL 123 hides the implementation details of the hardware 125 platform and the operating system 127 from higher level software, such as applications running on the node 103 or externally. Note that in the context being described herein, the SAL 123 on each node 103 abstracts the node's OS 127, system hardware 125 and BMC 115 from the operating system agnostic task scheduler 121 running on the TOR device 101. A SAL 123 can comprise a frontend 501 which exposes an Application Programming Interface ("API") 505 to application programs, and a backend 503 which interacts with the underlying abstracted system level components on the node 103, such as the OS kernel and hardware resources.

As described in more detail below, applications can execute operations on node level resources through the frontend API 505. The frontend API 505 may be usable by client applications and browser-based GUIs, and may provide schema-backed but human-readable output. The frontend 501 provides a single interface for all the system component interactions, whereas the backend 503 interacts directly with the OS implementation on the given node 103 (e.g., Windows, Linux CLI, sysfs, differences between OS distros, etc.), the node specific system hardware 125 (e.g., configuring and extracting information for different classes of hardware) and the BMC 115 (e.g., access differences between different vendors). The frontend 501 of the SAL 123 is common for all operating systems, whereas the backend 503 is operating system specific. Thus, applications such as the operating system agnostic task scheduler 121 can utilize a consistent frontend level interface to access node-level resources regardless of their low level implementation, whereas the backend 503 interacts with the specific node level components that are abstracted to the application interfacing with the frontend API 505.

In one embodiment, the frontend API 505 is implemented as a RESTful interface over Hyper Text Transfer Protocol Secure ("HTTPS") using a JavaScript Object Notation ("JSON") payload. JSON is a contemporary open-standard data format which is human readable and is supported by many modern programming languages. Representational state transfer ("REST" or "RESTful") web services enable requesting applications (e.g., the operating system agnostic task scheduler 121) to access and manipulate textual representations of resources using a uniform and predefined set of stateless operations. Such resources may be in the form of any entity that can be identified, named, addressed or handled over the Web, identified by a URL or URI. Through the RESTful API, requests can be made to operate on node level resources identifying them by URI. Requests may be made in HTTP(S) (or another protocol) using its methods GET, POST, PUT, DELETE, etc. Responses can be returned to the calling application in JSON (or another data description format). The underlying node level resources themselves are distinct from the (JSON) representations that are returned to the calling application. However, the representation of a resource (including any associated metadata) provides enough information to the calling application to further process or manage the resource, including to modify or delete it through further calls. Thus, in one embodiment the combination of REST, HTTPS and JSON is used to enable node level system management tasks to be performed using a robust tool chain across all applications. In other embodiments, other tools are used to instantiate the SAL 123. For example, instead of REST, a Simple Object Access Protocol ("SOAP") or Web Services Description Language ("WSDL") based interface, a socket based interface, or a proprietary interface could be used for the API 505. Other secure network communication protocols can be used instead of HTTPS (e.g., SPDY, HTTP/2, etc.). Data formatting description languages other than JSON can be used, such as XML, YMAL, etc.

In an embodiment using HTTPS, the following HTTP methods can be used to implement the following actions on node level system resources. HTTP GET can be used as the basis of a Read Requests call, used to request a representation of a specified resource. The representation can be, for example, either a single resource or a collection. PATCH can be used for an Update call, used to apply partial modifications to a resource. Replace (PUT) can be used to completely replace a resource. In one embodiment, any properties omitted from the body of a Replace request are reset to their default value. Create (POST) can be used to create a new resource. A CREATE request may be submitted to the appropriate resource collection to which the new resource is intended to belong. Actions (POST) can be used to initiate operations on an object (Actions), including scheduling and executing tasks 129 as described above. Delete (DELETE) can be used to remove a resource. It is to be understood that these are just examples, and other requests can be instantiated to take other actions concerning various resources in other embodiments as desired.

Different types of responses to the calling application are possible, such as metadata responses, describing the resources and types exposed by the service to clients, resource responses (e.g., a JSON representation of an individual resource), resource collection responses (e.g., a JSON representation of a collections of resources), error responses (e.g., a top-level JSON response providing additional information in the case of an HTTP error), etc. Again, these are just examples of response types. Others are possible in other embodiments as desired.

By interfacing with the front APIs 505 on the multiple nodes 103, the operating system agnostic task scheduler 121 is able to glean resource capability and availability information for the different nodes 103, and schedule tasks 129 accordingly as described above. The SAL 121 provides flexibility to support a variety of different system types including future system capabilities, and enables hardware discovery, event management, storage configuration and network configuration. The SAL 121 is hardware and OS agnostic, provides backwards compatibility to allow mixed deployments, as well as fast and stable support of new hardware types. The SAL 121 supports out-of-band access to system information, synchronous and asynchronous operations, and multiple programming environments. The operating system agnostic task scheduler 121 is thus able to manage the scheduling and execution of tasks 129 on the multiple nodes 103 having different operating systems 127 and/or hardware configurations by interfacing with the corresponding SAL frontend APIs 505.

FIGS. 1 and 2 illustrate an operating system agnostic task scheduler 121 residing on a single top of the rack device 101 on a given rack 100. It is to be understood that these are just an example embodiments. The functionalities of the operating system agnostic task scheduler 121 can be implemented on other computing devices 210 in other embodiments, or can be distributed between multiple computing devices 210. It is to be understood that although the operating system agnostic task scheduler 121 is illustrated in FIGS. 1 and 2 as a standalone entity, the illustrated operating system agnostic task scheduler 121 represents a collection of functionalities, which can be instantiated as a single or multiple modules on one or more computing devices 210 as desired.

It is to be understood the operating system agnostic task scheduler 121 can be instantiated as one or more modules (for example as object code or executable images) within the system memory 217 (e.g., RAM, ROM, flash memory 254) of any computing device 210, such that when the processor 214 of the computing device 210 processes a module, the computing device 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the operating system agnostic task scheduler 121 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in enough detail to enable the disclosed teachings to be practiced. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the below claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. The illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others to best utilize the various example embodiments with various modifications as are suited to the particular use contemplated.

Note that, although the terms "first," "second," and so forth may be used herein to describe various elements, these elements are not to be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for describing particular example embodiments only and is not intended to be limiting. As used in the description of the example embodiments and the appended claims, the singular forms "a," "an," and "the" are intended to include the plural forms as well, unless the context clearly indicates otherwise. Also note that the term "and/or" as used herein refers to and encompasses any and/or all possible combinations of one or more of the associated listed items. Furthermore, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As will be understood by those skilled in the art, the invention may be embodied in other specific forms without departing from the spirit or essential characteristics thereof. Likewise, the particular naming and division of the portions, modules, servers, managers, components, functions, procedures, actions, layers, features, attributes, methodologies, data structures and other aspects are not mandatory or significant, and the mechanisms that implement the invention or its features may have different names, divisions and/or formats. The foregoing description, for the purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method for operating system agnostic ("OS-agnostic") task scheduling in a Hyper Converged Infrastructure ("HCI") rack comprising a top of the rack ("TOR") device and a plurality of nodes, the method comprising:

receiving, by an OS-agnostic task scheduler executing on the TOR device from each specific one of the plurality of nodes, an OS-agnostic description of the specific node's computational resource capability and availability, wherein:

each specific one of the plurality of nodes runs a system abstraction layer ("SAL"), each SAL hiding information including an operating system of the specific node from the OS-agnostic task scheduler, each SAL exposing an Application Programming Interface ("API") for the OS-agnostic task scheduler to receive the OS-agnostic description of the specific node's computational resource capability and availability;
at least a first one of the plurality of nodes runs a first operating system; and
at least a second one of the plurality of nodes runs a second operating system;
maintaining, by the OS-agnostic task scheduler, an accounting of computational resource capability and availability of each specific one of the plurality of nodes using the OS-agnostic description received from each specific one of the plurality of nodes;
receiving, by the OS-agnostic task scheduler from a source external to the HCI rack, a request to execute a task on the HCI rack;
in response to receiving the request to execute the task, matching the task, by the OS-agnostic task scheduler, to a specific one of the plurality of nodes, based on the maintained accounting of computational resource capability and availability;
in response to matching the task to the specific one of the plurality of nodes, assigning the task, by the OS-agnostic task scheduler, to the specific one of the plurality of nodes, wherein the task executes on the specific one of the plurality of nodes to which the task is assigned; and
updating, by the OS-agnostic task scheduler, the maintained accounting of computational resource capability and availability based on computational resources allocated to the assigned task by the specific one of the plurality of nodes to which the task is assigned.

2. The computer-implemented method of claim 1, wherein receiving the OS-agnostic description of the specific node's computational resource capability and availability further comprises:
requesting the OS-agnostic description of the specific node's computational resource capability and availability from the SAL running on the specific node; and
receiving the OS-agnostic description of the specific node's computational resource capability and availability from the SAL running on the specific node.

3. The computer-implemented method of claim 1, further comprising:
receiving, by the OS-agnostic task scheduler, updated OS-agnostic description information from at least one SAL running on at least one specific one of the plurality of nodes; and
updating, by the OS-agnostic task scheduler, the maintained accounting of computational resource capability and availability based on the received updated OS-agnostic description information.

4. The computer-implemented method of claim 1, wherein updating, by the OS-agnostic task scheduler, the maintained accounting of computational resource capability and availability based on computational resources allocated to the assigned task by the specific one of the plurality of nodes to which the task is assigned further comprises:
receiving, by the OS-agnostic task scheduler from the SAL running on the specific node, an OS-agnostic quantification of the computational resources allocated to the assigned task; and
updating, by the OS-agnostic task scheduler, the maintained accounting of computational resource capability and availability based on the received OS-agnostic quantification.

5. The computer-implemented method of claim 4, further comprising:
receiving, by the OS-agnostic task scheduler from the SAL running on the specific node, at least one updated OS-agnostic quantification of the computational resources allocated to the assigned task as the assigned task runs and exits on the specific node; and
updating, by the OS-agnostic task scheduler, the maintained accounting of computational resource capability and availability based on the at least one received updated OS-agnostic quantification.

6. The computer-implemented method of claim 1, further comprising:
updating, by the OS-agnostic task scheduler, the maintained accounting of computational resource capability and availability in response to receiving an indication that at least one new node has been added to the plurality of nodes on the HCI rack.

7. The computer-implemented method of claim 1, further comprising:
updating, by the OS-agnostic task scheduler, the maintained accounting of computational resource capability and availability in response to receiving an indication that at least one node has been removed from the plurality of nodes on the HCI rack.

8. The computer-implemented method of claim 1, further comprising:
receiving, by the OS-agnostic task scheduler, multiple requests to execute tasks on the HCI rack, from multiple sources external to the HCI rack;
in response to receiving each specific request to execute a specific task on the HCI rack, matching the specific task, by the OS-agnostic task scheduler, to a specific one of the plurality of nodes, based on the maintained accounting of computational resource capability and availability; and
in response to matching the specific task to the specific one of the plurality of nodes, assigning the specific task by the OS-agnostic task scheduler to the specific one of the plurality of nodes, wherein the specific task executes on the specific one of the plurality of nodes to which the specific task is assigned;
wherein different ones of the multiple tasks are assigned to and execute on different ones of the plurality of nodes running different operating systems.

9. The computer-implemented method of claim 1, wherein:
the request to execute the task further comprises a request to access at least one given file system object.

10. The computer-implemented method of claim 1, wherein:
the request to execute the task further comprises a request to perform at least one specific computational operation on a given input.

11. The computer-implemented method of claim 1, wherein:
the SAL running on a node of the plurality of nodes comprises a frontend that exposes the API providing OS-agnostic access, and a backend that interacts with operating system and hardware level components on the node, wherein the frontend is common for all operating systems and the backend is operating system specific; and
the OS-agnostic task scheduler utilizes the API to access resources on the node.

12. The computer-implemented method of claim 11, wherein:

the frontend API further comprises a Representational state transfer ("RESTful") interface over Hyper Text Transfer Protocol Secure ("HTTPS") providing OS-agnostic output using JavaScript Object Notation ("JSON").

13. The computer-implemented method of claim 1, wherein the TOR device further comprises:
a TOR switch.

14. The computer-implemented method of claim 1, wherein the TOR device further comprises:
a TOR fabric element.

15. The computer-implemented method of claim 1, further comprising:
the OS-agnostic task scheduler executing on a virtual machine on the TOR.

16. The computer-implemented method of claim 1, further comprising:
the OS-agnostic task scheduler executing on a host operating system on the TOR.

17. The computer-implemented method of claim 1, wherein:
the first operating system comprises Linux; and
the second operating system comprises Windows.

18. The computer-implemented method of claim 1, further comprising:
running a dynamic host configuration protocol ("DHCP") server on a virtual machine on the TOR device;
for each specific one of the plurality of nodes, allocating an internet protocol address to the specific node using the DHCP server of the virtual machine; and
for each specific one of the plurality of nodes, obtaining, by the OS-agnostic task scheduler from the DHCP server, the internet protocol address allocated to the specific node.

19. A Hyper Converged Infrastructure ("HCI") rack based computing system comprising:
a top of the rack switch comprising a processor and a memory, the top of the rack switch communicatively coupled to a plurality of node elements, wherein:
at least a first one of the plurality of node elements runs a first operating system;
at least a second one of the plurality of node elements is configured to run a second operating system;
an operating system agnostic ("OS-agnostic") task scheduler configured to execute on the top of the rack switch; and
a system abstraction layer ("SAL") configured to:
run on each specific one of the plurality of node elements;
hide information including an operating system of each specific one of the plurality of node elements from the OS-agnostic task scheduler; and expose an Application Programming Interface ("API") for the OS-agnostic task scheduler to receive an OS-agnostic description of computational resource capability and availability of each specific one of the plurality of node elements;
wherein the OS-agnostic task scheduler is stored in the memory and executable by the processor, the OS-agnostic task scheduler further configured to:
receive, from the SAL running on each specific one of the plurality of node elements, an OS-agnostic description of the specific node element's computational resource capability and availability;
maintain an accounting of computational resource capability and availability of each specific one of the plurality of node elements using the received OS-agnostic description;
receive, from a source external to the HCI rack, a request to execute a task on the HCI rack;
match the task to a specific one of the plurality of node elements, based on the maintained accounting of computational resource capability and availability;
assign the task to the specific one of the plurality of node elements, wherein the task executes on the specific one of the plurality of node elements to which the task is assigned; and
update the maintained accounting of computational resource capability and availability based on computational resources allocated to the assigned task by the specific one of the plurality of node elements to which the task is assigned.

20. A system, comprising:
means for receiving, by an operating system agnostic ("OS-agnostic") task scheduler executing on a top of the rack switch, an OS-agnostic description of computational resource capability and availability from each specific one of a plurality of nodes, each specific one of the plurality of nodes running a system abstraction layer for hiding information including an operating system of each specific one of the plurality of nodes from the OS-agnostic task scheduler and for exposing an application programming interface for the OS-agnostic task scheduler to receive the OS-agnostic description of computational resource capability and availability from each specific one of the plurality of nodes;
means for maintaining, by the OS-agnostic task scheduler, an accounting of computational resource capability and availability of each specific one of the plurality of nodes using the OS-agnostic description received from each specific one of the plurality of nodes;
means for receiving, by the OS-agnostic task scheduler, a request to execute a task from an external source;
means for matching, by the OS-agnostic task scheduler, the task to a specific one of the plurality of nodes based on the maintained accounting of computational resource capability and availability;
means for assigning, by the OS-agnostic task scheduler, the task to the specific one of the plurality of nodes, wherein the task executes on the specific one of the plurality of nodes to which the task is assigned; and
means for updating, by the OS-agnostic task scheduler, the maintained accounting of computational resource capability and availability based on computational resources allocated to the assigned task by the specific one of the plurality of nodes to which the task is assigned.

* * * * *